(12) United States Patent
Imanilov

(10) Patent No.: US 10,439,753 B2
(45) Date of Patent: Oct. 8, 2019

(54) MULTI-PROTOCOL COMMUNICATIONS BETWEEN HOST DEVICES AND STYLUS DEVICES

(71) Applicant: Microsoft Technology Licensing, LLC, Redmond, WA (US)

(72) Inventor: Benjamin Imanilov, Hod haSharon (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 202 days.

(21) Appl. No.: 15/605,369

(22) Filed: May 25, 2017

(65) Prior Publication Data

US 2018/0343079 A1 Nov. 29, 2018

(51) Int. Cl.
*H04L 29/06* (2006.01)
*H04K 1/00* (2006.01)
*G06F 3/0354* (2013.01)
*G06F 3/041* (2006.01)

(52) U.S. Cl.
CPC .......... *H04K 1/003* (2013.01); *G06F 3/03545* (2013.01); *G06F 3/041* (2013.01); *H04L 63/0428* (2013.01)

(58) Field of Classification Search
CPC ..... H04K 1/003; G06F 3/03545; G06F 3/041; H04L 25/03866; H04L 63/0428
USPC .......................................................... 380/252
See application file for complete search history.

(56) References Cited

U.S. PATENT DOCUMENTS

| | | | |
|---|---|---|---|
| 3,463,911 A | 8/1969 | Dupraz et al. | |
| 5,428,369 A | 6/1995 | Pranger et al. | |
| 7,426,643 B2 | 9/2008 | Homer et al. | |
| 7,903,818 B2 | 3/2011 | Park et al. | |

(Continued)

FOREIGN PATENT DOCUMENTS

| | | | | |
|---|---|---|---|---|
| CN | 103677339 A | * | 3/2014 | ............. H04K 1/003 |
| EP | 0331151 A2 | | 9/1989 | |

(Continued)

OTHER PUBLICATIONS

Lee, et al., "Haptic Pen: A Tactile Feedback Stylus for Touch Screens", In Proceedings of the 17th annual ACM Symposium on User Interface Software and Technology, Oct. 24, 2004, pp. 291-294.

(Continued)

*Primary Examiner* — Michael S McNally
(74) *Attorney, Agent, or Firm* — Holzer Patel Drennan

(57) ABSTRACT

A host device communicates with a stylus device. A digitizer at the host device receives a scrambled stylus code frame transmitted from the stylus device. The scrambled stylus code frame includes a scrambled data field and an unscrambled data field. The scrambled data field has been scrambled by the stylus device using a pseudo-random sequence. A descrambler descrambles the at least one scrambled data field of the scrambled stylus code frame using the pseudo-random sequence to output at least one descrambled data field in a descrambled stylus code frame. The descrambled stylus code frame further includes the at least one unscrambled data field. A synchronizer synchronizes the at least one descrambled data field and the at least one unscrambled data field of the descrambled stylus code frame with a supported code pattern.

20 Claims, 10 Drawing Sheets

(56) References Cited

U.S. PATENT DOCUMENTS

| | | |
|---|---|---|
| 8,094,137 B2 | 1/2012 | Morrison |
| 8,481,872 B2 | 7/2013 | Zachut |
| 8,971,305 B2 | 3/2015 | Malladi et al. |
| 9,107,239 B2 | 8/2015 | Khandekar et al. |
| 9,329,703 B2 | 5/2016 | Falkenburg et al. |
| 9,335,874 B2 | 5/2016 | Buelow et al. |
| 9,389,709 B2 | 7/2016 | Miller et al. |
| 9,477,350 B2 | 10/2016 | Sheng et al. |
| 9,495,011 B1 | 11/2016 | Lee et al. |
| 9,524,044 B2 | 12/2016 | Zachut |
| 2007/0246539 A1 | 10/2007 | Sandstrom et al. |
| 2008/0169132 A1 | 7/2008 | Ding et al. |
| 2010/0199229 A1 | 8/2010 | Kipman et al. |
| 2012/0242603 A1 | 9/2012 | Engelhardt et al. |
| 2015/0050879 A1 | 2/2015 | MacDuff et al. |
| 2015/0363012 A1 | 12/2015 | Sundara-Rajan et al. |
| 2016/0014598 A1* | 1/2016 | Westhues .............. H04W 12/04 380/259 |
| 2016/0048234 A1 | 2/2016 | Chandran et al. |
| 2016/0195941 A1 | 7/2016 | Gur et al. |
| 2016/0195943 A1* | 7/2016 | Gur .................... G06F 3/03545 345/179 |
| 2016/0209940 A1 | 7/2016 | Geller et al. |
| 2016/0337496 A1 | 11/2016 | Gilbert et al. |
| 2016/0357275 A1 | 12/2016 | Ribeiro |
| 2018/0239445 A1 | 8/2018 | Barel |
| 2018/0246587 A1 | 8/2018 | Dekel |

FOREIGN PATENT DOCUMENTS

| | | |
|---|---|---|
| EP | 1011234 A1 | 6/2000 |
| EP | 26748371 A1 | 12/2013 |
| WO | 2014088659 A1 | 6/2014 |
| WO | 2016189322 A1 | 12/2016 |
| WO | 2017004506 A1 | 1/2017 |

OTHER PUBLICATIONS

Malik, et al., "A Signature Verification Framework for Digital Pen Applications", In Proceedings of 10th IAPR International Workshop on Document Analysis Systems, Mar. 27, 2012, pp. 419-423.

Reeve, Whitham D., "Telecommunications Synchronization Overview" In Reeve Engineers, File: Synchronization.doc, Issue 1, Aug. 6, 2002 pp. 1-21.

Dekel, Shoham., "Configurable Communication Protocol for Communication Between a Stylus Device and a Host Device", U.S. Appl. No. 15/441,410, filed Feb. 24, 2017, 36 pages.

Pandya, K., Comparative Study on Wireless Mobile Technology: IG, 2G, 3G, 4G and 5G, Sep. 2015, International Journal of Recent Trends in Engineering & Research, vol. 1, Issue 1, p. 26.

Qualcomm OnQ Blog; "From LTE to Wi-Fi and back: Call Continuity brings the next generation of calling", Jan. 5, 2015, from https://www.qualcom.com/news/ong/2015/01/05/lte-wi-fi-and-back-call-continuity-brings-next-generation-calling.

"Final Office Action Issued in U.S. Appl. No. 15/441,410", dated Jul. 10, 2018, 15 Pages.

"Non-Final Office Action Issued in U.S. Appl. No. 15/441,410", dated Mar. 8, 2018, 13 Pages.

"Notice of Allowance Issued in U.S. Appl. No. 15/441,410", dated Sep. 26, 2018, 8 Pages.

* cited by examiner

MULTI-PROTOCOL COMMUNICATIONS BETWEEN HOST DEVICES AND STYLUS DEVICES

BACKGROUND

A stylus device is a writing utensil, typically in the shape of a pen, that can be used to interact with a host device, such as a tablet computer. In many implementations, a stylus device interacts with a touch sensitive display that includes a grid of capacitively-coupled electrodes (as part of a digitizer) positioned within an electronic display of the host device, although other mechanisms for communicating between the stylus device and the host device may be employed. In various implementations, an active stylus device can communicate with the digitizer of the host device, whether uni-directionally (e.g., from the stylus device to the digitizer) or bi-directionally.

As improvements in stylus devices and host devices are made, the communications protocols and capabilities of the two devices evolve. However, such evolution can cause communication incompatibility and/or signaling interference between either legacy stylus devices and newer host devices or newer stylus devices and legacy host devices, thereby preventing or impairing accurate communications between the devices.

SUMMARY

Implementations described herein include a stylus device configured to communicate with a digitizer of the host device. The digitizer at the host device receives a scrambled stylus code frame transmitted from the stylus device. The scrambled stylus code frame includes a scrambled data field and an unscrambled data field. The scrambled data field has been scrambled by the stylus device using a pseudo-random sequence. A descrambler descrambles the at least one scrambled data field of the scrambled stylus code frame using the pseudo-random sequence to output at least one descrambled data field in a descrambled stylus code frame. The descrambled stylus code frame further includes the at least one unscrambled data field. A synchronizer synchronizes the at least one descrambled data field and the at least one unscrambled data field of the descrambled stylus code frame with a supported code pattern.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other implementations are also described and recited herein.

BRIEF DESCRIPTIONS OF THE DRAWINGS

DETAILED DESCRIPTIONS

Figure 1:
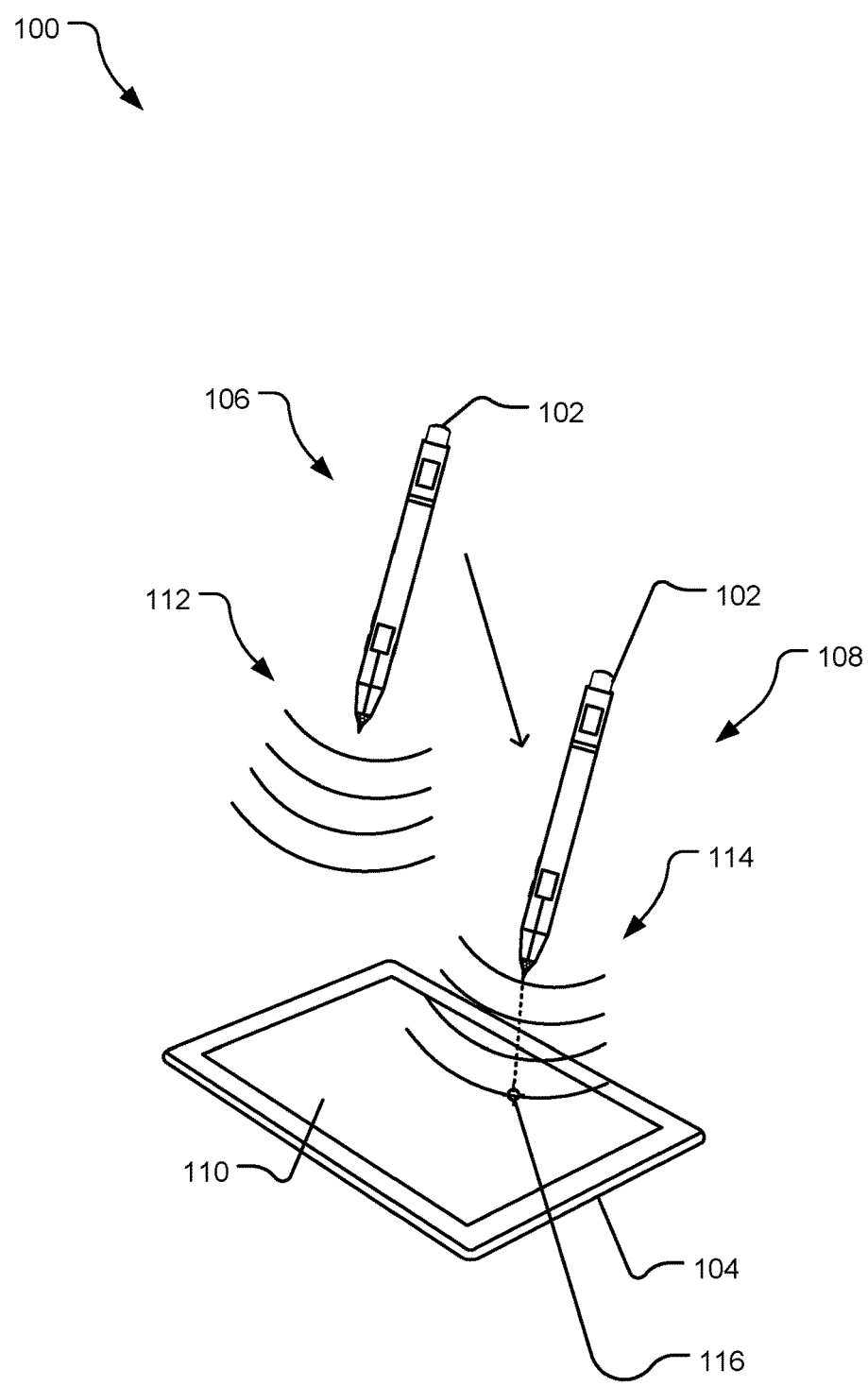
FIG. 1 illustrates an example system including a stylus device and a host device, wherein at least one device supports multi-protocol communications.

Some electronic computing devices (referred to herein as example "host devices") include a display with a built-in digitizer to sense the location of the writing tip of a stylus device. With such an electronic computing device, a user interacts with the digitizer by moving the writing tip of the stylus device over a sensing surface of the host device's display, e.g., in a tablet and/or a touch screen. The position of the writing tip with respect to the sensing surface is tracked by the digitizer. In some technologies, the position of the writing tip can be determined based on detection of capacitive coupling between a transmitting electrode of the stylus device and one or more electrodes of the digitizer, although other technologies may be employed. To accurately identify tip position, the transmitting electrode is, in some technologies, physically positioned within a writing tip of the stylus device. Three-dimensional tip position, angular tilt of the stylus device (with respect to the plane of the digitizer), and rotational position (around the long axis of the stylus device) may also be detected through the digitizer.

In addition, in an active stylus device, the stylus device can transmit one or more stylus code signals from a stylus device electrode to the digitizer, which may include a plurality of X and Y oriented conductors or a resistive film to receive the transmitted signals. Multiple stylus code signals may also be transmitted by a stylus device concurrently. The data signal(s) transmitted by the stylus device can be received by the digitizer and interpreted as a stylus code by the host device in a uni-directional communication channel. Some host-stylus device pairs can handle bi-directional communications between the host device and the stylus device.

In one implementation, an example active stylus device generates a modulated signal that can be detectable by an example digitizer in a host device. The modulated signal may be generated based on a selected communication protocol and repeated periodically for an extended time (e.g., until a change of stylus state, a change in tip pressure, while the stylus device turned on). The modulated signal carries a stylus code that is about 15 ms in length but may be shorter or longer in various implementations. The signal may be encoded with information such as the device identification (e.g., stylus ID), operational mode (e.g., hovering, inking, erasing), pressure information, tilt information, button press, sliding controller, and other information.

The repeated nature of the signal combined with the concurrent transmission of signals having multiple communication protocols can lead to interference between or among the multiple signals. For example, to a host device supporting a legacy protocol signal may misinterpret a newer protocol signal as the legacy protocol signal. The newer protocol signal would be considered an "interferer" in this context. Furthermore, the repeating nature of the newer protocol signal increases the likelihood that the misinterpretation would continue for multiple repeated frames, absent the scrambling technology disclosed herein. The disclosed scrambling technology substantially avoids receipt of repeating misinterpreted signals over multiple stylus code frames because each successive frame contains data fields scrambled/descrambled by a different pseudo-random sequence (PRS) segment. As such, the repeating misinterpretation can be avoided over multiple frames. Descrambling a data field in a frame refers to an action of using a scrambling code to descramble the data field, which was initially scrambled using the same scrambling code (e.g., using XOR operations). An unscrambled data field in a frame has been neither scrambled nor descrambled using the scrambling code.

The stylus information may be allocated to various portions of the stylus code frame. For example, a beacon code may be encoded in a first portion of the signal; the stylus identifier and the operational mode may be encoded in a second portion of the signal, and the pressure information may be encoded in a third portion of the signal. Other stylus code frame formats may be employed in other protocols. Such information is detectable by the host device (e.g., tablet, smart phone) and is used by the host device to interact with the stylus device (e.g., to provide functionality in the display of the host system, to forward to the operating system of the host device, to forward as input or control information to an application executing on the host device). For example, the host device detects a stylus that is in inking mode with identifiable pressure information. The host device can use that information (in combination with position information detected through the digitizer) to display digital ink with the thickness dependent on the pressure information encoded in the signal.

The digitizer of the host device may be configured to sample the detected stylus codes frames in certain increments. For example, the digitizer sampling rate may be synchronized with the stylus code frame length. In addition, stylus devices may be specifically configured to work with certain host devices (e.g., from particular manufacturers). As such, the stylus code frame length and composition of a stylus signal may be configured to work with digitizers of certain host devices. The stylus code may be static and repetitive between different operational states, in that it repeats the same information in the same stylus code frame format (e.g., the same information is allocated to the same data fields of a 15 ms-long stylus code frame) across multiple communication windows because a digitizer in the host device is be configured to detect the specific frame format and content. Multiple stylus code frame formats may be supported by a stylus device and/or a host device at the same time.

When mixing different stylus devices with different host devices, matching up the various stylus code frame formats that may be supported by each device becomes challenging. In some implementations, a stylus device may concurrently transmit frames of different formats to a digitizer, one or more of the frames corresponding to a format potentially supported by a stylus/host device pairing. However, if a new stylus device attempts to communicate with a legacy host device (or vice versa), the legacy host device may not have the capability of communicating accurately via the new stylus device's newer frame format. As such, for example, the stylus device communicates with the host device using a signal complying with a legacy communication protocol, which the stylus device is potentially transmitting concurrently with one or more signals complying with different and/or newer communication protocols. For example, the stylus device can transmit a signal of a legacy communications protocol concurrently with one or more signals of different protocols, wherein the signals are intended to be orthogonal (e.g., having time domain orthogonality, frequency domain orthogonality, code orthogonality, spatial orthogonality, complex representation orthogonality). Unfortunately, because the intended orthogonality is not sufficiently maintained at synchronization of the transmitted signals at a host device, the host device may misinterpret a newer frame format for a legacy frame format, thereby acquiring an incorrect stylus code. A challenge is to quickly and accurately acquire a stylus code signal having a communication frame format supported by both devices, particularly in pairings having only unidirectional communications from the stylus device to the digitizer of the host device.

FIG. 1 illustrates an example system 100 including a stylus device 102 and a host device 104, wherein at least one device supports multi-protocol communications. The stylus device 102 is typically held by a user, who moves the stylus device 102 from outside its communications range with the host device 104, at position 106, to inside its communication range with the host device 104, at position 108. The host device 104 includes a digitizer in its display 110.

At both position 106 and position 108, the stylus device 102 is transmitting one or more stylus code signals (shown as signals 112 and signals 114 in their respective positions) for communicating with the host device 104. It should be understood that, at each position, the stylus device 102 may be concurrently transmitting multiple stylus code signals, some of different communication protocols, including different stylus code frame formats. At position 106, the host device 104 does not accurately receive and process the signal 112 because the stylus device 102 is outside its communication range with the host device 104. At position 106, the stylus device 102 is moved within its communication range with the host device 104. Therefore, at position 108, the stylus device 102 can successfully communicate with the host device 104, subject to communication errors, including without limitation mutually-unsupported communication protocols, signal mis-synchronization, command misinterpretation, etc. In FIG. 1, successful communication is exhibited by a display of a hover mark 116 on the display 110.

In addition, if the stylus device 102 supports multiple communication protocols, the stylus device 102 may transmit a signal at each supported communication protocol concurrently. In this sense, the term "concurrently" may include, but need not require, simultaneous transmission and may employ one or more encoding methods, including without limitation Amplitude Shift Keying (ASK), Phase Shift Keying (PSK) and Frequency Shift Keying (FSK). Such concurrent transmission of multiple signals may result in a misinterpretation by the digitizer of one of the signals as a different one of the signals, thereby causing a misinterpretation of the intended stylus code. This misinterpretation may be more probably because of the typically repeating nature of the stylus device signals. For example, if there is a misinterpretation of a frame of a stylus frame, the repeating nature of the frame transmission (e.g., the same frame it transmitted multiple times) can compound the misinterpretation because the misinterpreted data is repeated periodically, absent the disclosed scrambling technique. Using the disclosed scrambling technique, such misinterpretations can quickly be detected and corrected because the subsequent frames are scrambled/descrambled using a different PRS segment as compared to the first misinterpreted frame.

A legacy host device tries to detect a legacy protocol before determining the frame start time. A newer host device, which should also support legacy stylus devices, can also start to detect legacy protocol signals before determining the frame start time. In both cases, the newer protocol signals, which may not be orthogonal because of a lack of alignment or other factors, could be misinterpreted as legacy protocol signals. To avoid such miscommunication, the stylus device 102 uses a scrambling technique that scrambles a proper subset of the data fields in a frame of a stylus code using a pseudo-random sequence and transmits the scrambled stylus code to the digitizer of the host device 104. The digitizer of the host device 104 receives the scrambled stylus code frame, descrambles the scrambled stylus code frame using the same pseudo-random sequence, and attempts to synchronize on the descrambled stylus code frame using a supported code pattern. If synchronization after descrambling is successful, then the host device 104 has a high probability of acquiring a stylus code in a communication protocol the host device 104 can understand. If synchronization after descrambling is unsuccessful, then the stylus code was highly likely to have been transmitted in a communication protocol that is unsupported by the host device 104. As such, the host device 104 does not acquire (and therefore does not misinterpret) the stylus code in the unsupported communication protocol.

Figure 2:
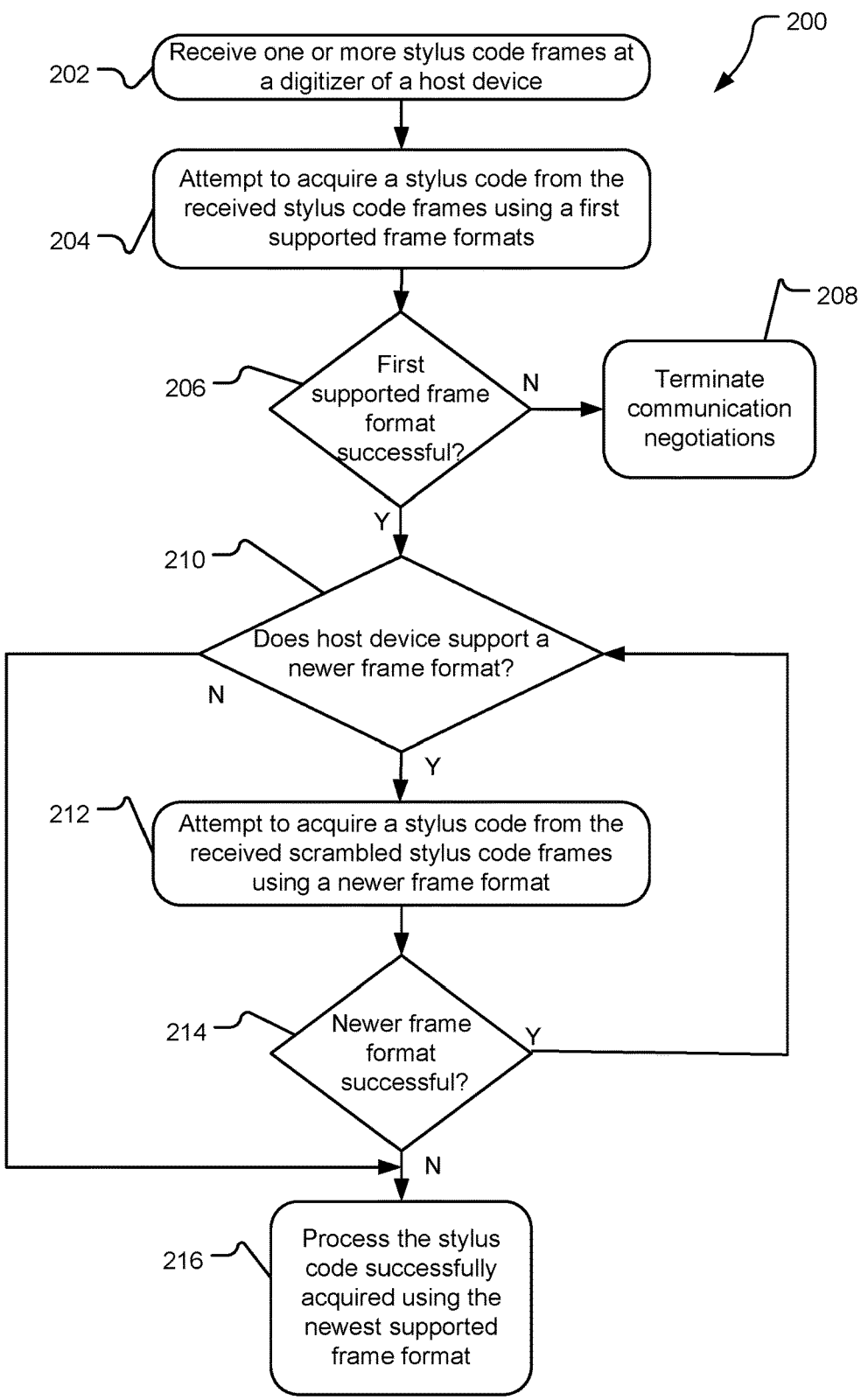
FIG. 2 illustrates example operations for a host device establishing communications with a stylus device.

FIG. 2 illustrates example operations 200 for a host device establishing communications with a stylus device. For legacy host devices (e.g., those not supporting the disclosed scrambling technology), in one implementation, a host device simply checks for unscrambled legacy protocol signals.

For newer host devices, at least four host/stylus device pairings may exist:
 1. The stylus device and the host device do not support any common communication protocol.
 2. The host device and the stylus device support at least one common communication protocol, and the host device supports at least one newer communication protocol than the stylus device.
 3. The host device and the stylus device support at least one common communication protocol, and the stylus device supports at least one newer communication protocol than the host device.
 4. The stylus device and the host device support the same communication protocol(s).

In the first pairing case (no common supported communication protocol), accurate communication is not available between the two devices. Nevertheless, the host device is more likely to misinterpret the unsupported-protocol transmissions from the stylus device as a stylus code in a supported protocol, absent the scrambling technology described herein. The operations 200 test for this case at a decision operation 206. In the second case (host device supports a newer protocol), the host device initially establishes communication with the stylus device via the first (common) protocol and then tests successively newer (supported) protocols until the newest protocol is determined to be unsuccessful in a decision operation 214. In the third case (stylus device supports a newer protocol), the host device initially establishes communication with the stylus device via the first (common) protocol and then tests successively newer (supported) protocols, if any, until the host device exhausts its newer protocol options in a decision operation 210, leaving the stylus device's newer protocols untested and unused. In the fourth case (devices support the same protocols), the host device initially establishes communication with the stylus device via the first (common) protocol and then tests successively newer (supported) protocols, if any, until the host device exhausts its newer protocol options in the decision operation 210, at which point the stylus device has exhausted its newer protocol options as well. Other cases may exist as variations of these themes.

A receiving operation 202 receives one or more stylus code frames at a digitizer of a host device. One or more of the stylus code frames includes a proper subset of the data fields in a frame of the stylus code that is scrambled by the stylus device using a pseudo-random sequence. (Note: For certain legacy protocols, an unscrambled stylus frame may be the only frame format supported.) Example data fields of a frame may include without limitation a beacon data field, a digital data field, a pressure data field, and one or more fields of error detection and/or correction. The term "proper subset" denotes that at least one data field of the frame is scrambled and at least one data field of the frame is not scrambled (i.e., unscrambled). An acquisition operation 204 may descramble a received stylus code frame using the same pseudo-random sequence, if the communication protocol support scrambling, and attempts to acquire a stylus code from the (descrambled) stylus code frame using a first supported frame format. Typically, the first supported frame format is an oldest commonly supported or legacy frame format, which may be unscrambled, although other commonly supported frame formats may be employed, if available. If the decision operation 206 determines that the acquisition of the stylus code using the first supported frame format was unsuccessful, then the stylus device and the host device likely do not support a common communication protocol. As such, a termination operation 208 terminates the communication negotiations between the host device and the stylus device.

If the acquisition of the stylus code is determined in the decision operation 206 to be successful using the first supported frame format, then the decision operation 210 determines whether the host device supports a newer communication frame format. If not, a processing operation 216 processes the correctly acquired stylus code using the newest successful frame format (i.e., first supported frame format). Otherwise, another acquisition operation 212 descrambles a received scrambled stylus code frame using a new pseudo-random sequence and attempts to acquire a stylus code from this descrambled stylus code signal using the newer frame format. Typically, the newer frame format is the next newest protocol supported by the host device (with each newer frame format being tested in succession), although other incremental methods of testing supported frame formats may be employed.

If the decision operation 214 determines that the acquisition of the stylus code using the newer supported frame format was unsuccessful, then the stylus device and the host device continue to communicate and interact using the previously successful frame format (e.g., the newest frame format that was successful) in the processing operation 216. Otherwise, if the decision operation 214 determines that the acquisition of the stylus code using the newer supported frame format was successful, then the decision operation 210 determines whether the host device supports another frame format. If so, that frame format (and other possibly supported frame format) are incrementally tested in this loop. Otherwise, the stylus device and the host device continue to communicate and interact using the previously successful frame format (e.g., the newest frame format that was successful) in the processing operation 216.

Figure 3:
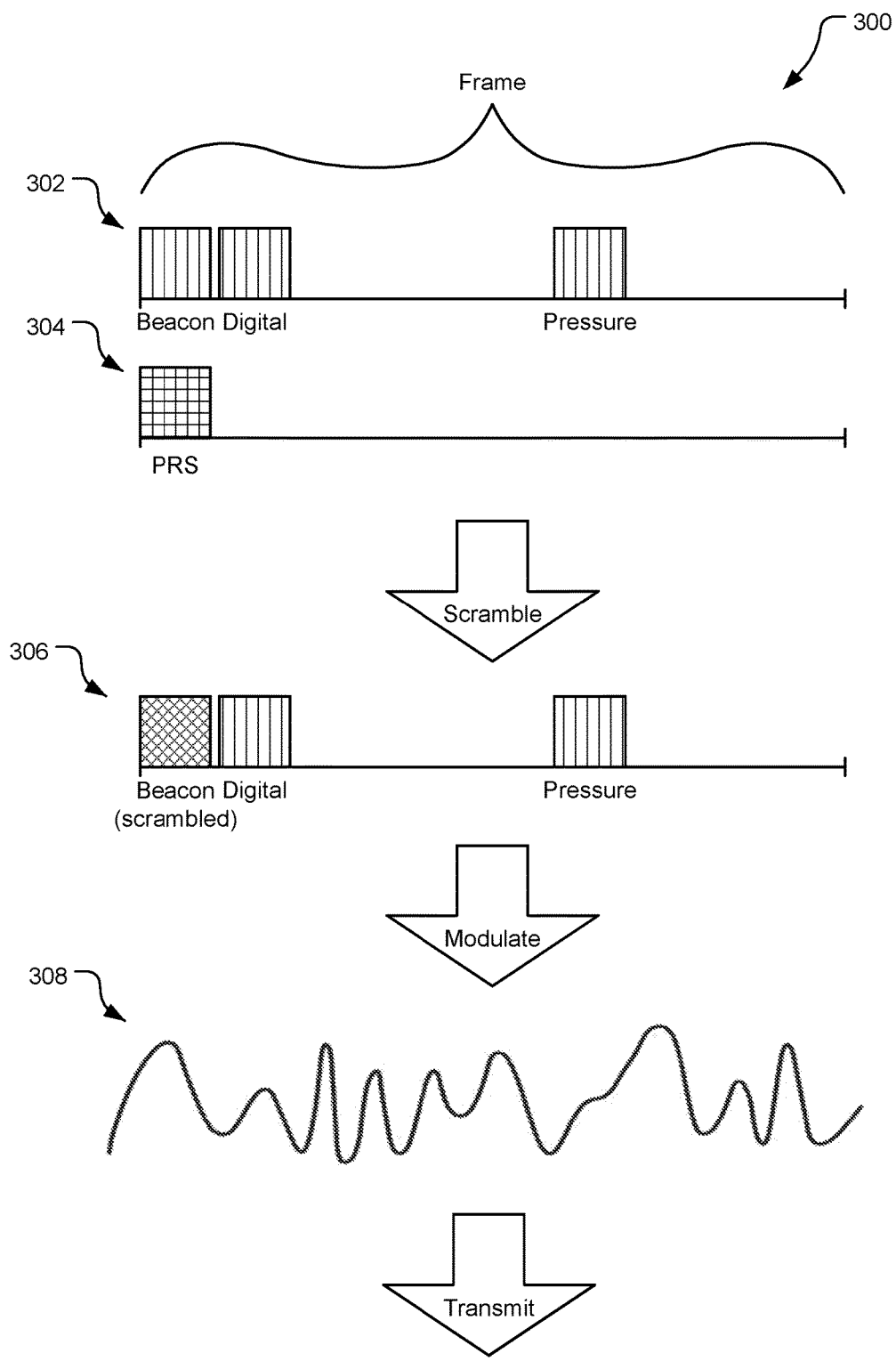
FIG. 3 illustrates generation and transmission of an example scrambled stylus signal at a stylus device.

FIG. 3 illustrates generation and transmission (collectively at 300) of an example scrambled stylus code signal at a stylus device. An example stylus code frame 302 includes a plurality of data fields: a beacon data field, a digital data field, and a pressure data field. The beacon data field is used by the digitizer to locate the position of the stylus tip relative to the digitizer and to synchronize the digitizer with timing of the stylus code signal. The digital data field transmits one or more operational parameters to the digitizer, possibly including without limitation a stylus identifier. The pressure data field encodes pressure data indicative of sensed pressure on the stylus tip (e.g., as it is pressed against the display screen of the host device). Other data fields and frame protocols may be employed, and variations thereof present examples of the potential communication protocol differences between newer devices and legacy devices—legacy devices may not support the newer communication protocols supported by new devices. Moreover, a newer protocol signal is more likely to be misinterpreted as a legacy protocol signal absent the scrambling technology described herein.

A scrambler in the stylus device scrambles the example stylus code frame 302 using a pseudo-random sequence (PRS) 304 of bits, such as by multiplying or XORing the PRS 304 and a proper subset of the data fields of the example stylus code frame 302. Typically, a PRS or PRS segment may be generated by a sequence generator or state machine that can be implemented in software and/or in hardware in both the stylus and the host device such that each device is scrambling/descrambling the same data fields of the same frame using the same PRS segment. By multiplying a proper subset of the data fields of the example stylus code frame 302, at least one data field of the example stylus code frame 302 is not scrambled. Other scrambling techniques may be employed.

The scrambler generates a scrambled stylus code frame 306 having a proper subset of the data fields within the frame scrambled by the PRS. In the illustrated case, the scrambled stylus code frame 306 includes a scrambled beacon data field and unscrambled digital and pressure data fields. It should be understood, however, that alternative implementations may scramble one or more different data fields, a partial data field, or more than one data field within a stylus code frame. A modulator in the stylus device modulates the scrambled stylus code frame 306 to generate a modulated scrambled stylus code frame as a modulated signal 308 for transmission. Example modulation schemes may include without limitation Amplitude Shift Keying (ASK), Phase Shift Keying (PSK), Frequency Shift Keying (FSK), and combinations and/or hybrids thereof. A transmitter in the stylus device (e.g., coupled to a transmission electrode) transmits the modulated signal 308 for reception by a digitizer of a host device that is within communications range.

It should be understood that scrambling and modulation could use the orthogonality properties of time domain orthogonality, frequency domain orthogonality, code orthogonality, spatial orthogonality, complex representation orthogonality, and/or other orthogonality properties. Scrambling may be performed at a data level (e.g., by XOR operations) or at the modulation level (e.g., by multiplication by ±1).

Figure 4:
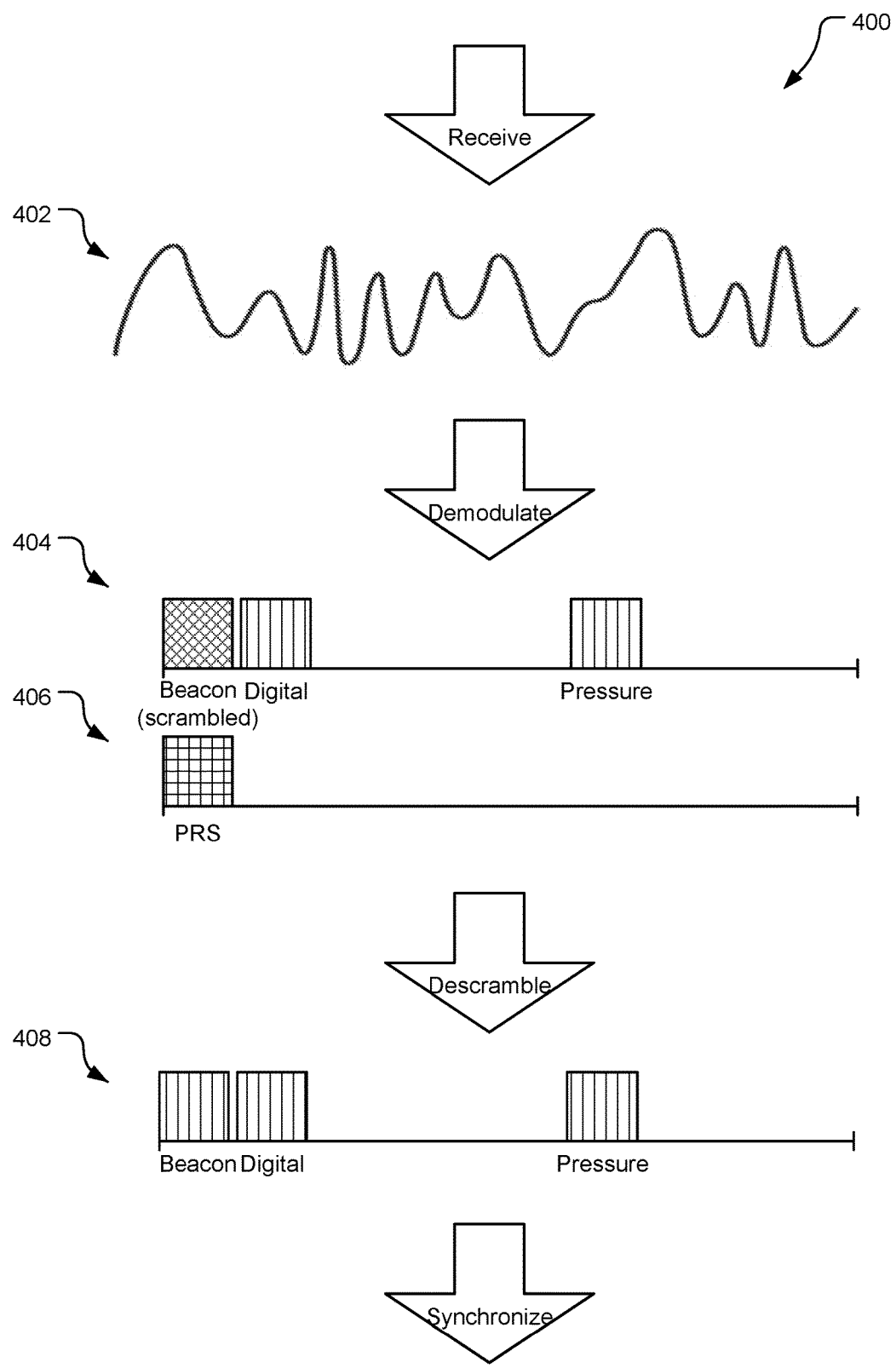
FIG. 4 illustrates receipt and synchronization of an example scrambled stylus signal at a host device.

FIG. 4 illustrates receipt and synchronization (collectively at 400) of an example scrambled stylus code signal at a host device. A transceiver or receiver in the host device receives a modulated signal 402 from a stylus device. The modulated signal 402 includes a modulated scrambled stylus code frame generated and transmitted by the stylus device.

A demodulator in the host device demodulates the modulated signal 402 to generate a scrambled stylus code frame 404. The scrambled stylus code frame 404 in FIG. 4 is shown as having a proper subset of the data fields within the frame scrambled by the PRS. In the illustrated case, the scrambled stylus code frame 404 includes a scrambled beacon data field and unscrambled digital and pressure data fields. a scrambled beacon data field and unscrambled digital and pressure data fields. It should be understood, however, that alternative implementations may scramble one or more different data fields, a partial data field, or more than one data field within a stylus code frame.

A descrambler in the host device descrambles the scrambled stylus code frame 404 using the same PRS 406 used by a transmitting stylus device. The descrambler generates a descrambled stylus code frame 408 in which the beacon data field has been descrambled, and the digital and pressure data fields remain unscrambled. A synchronizer in the host device then synchronizes or attempts to synchronize the descrambled stylus code frame 408 with one or more expected stylus codes.

Figure 5:
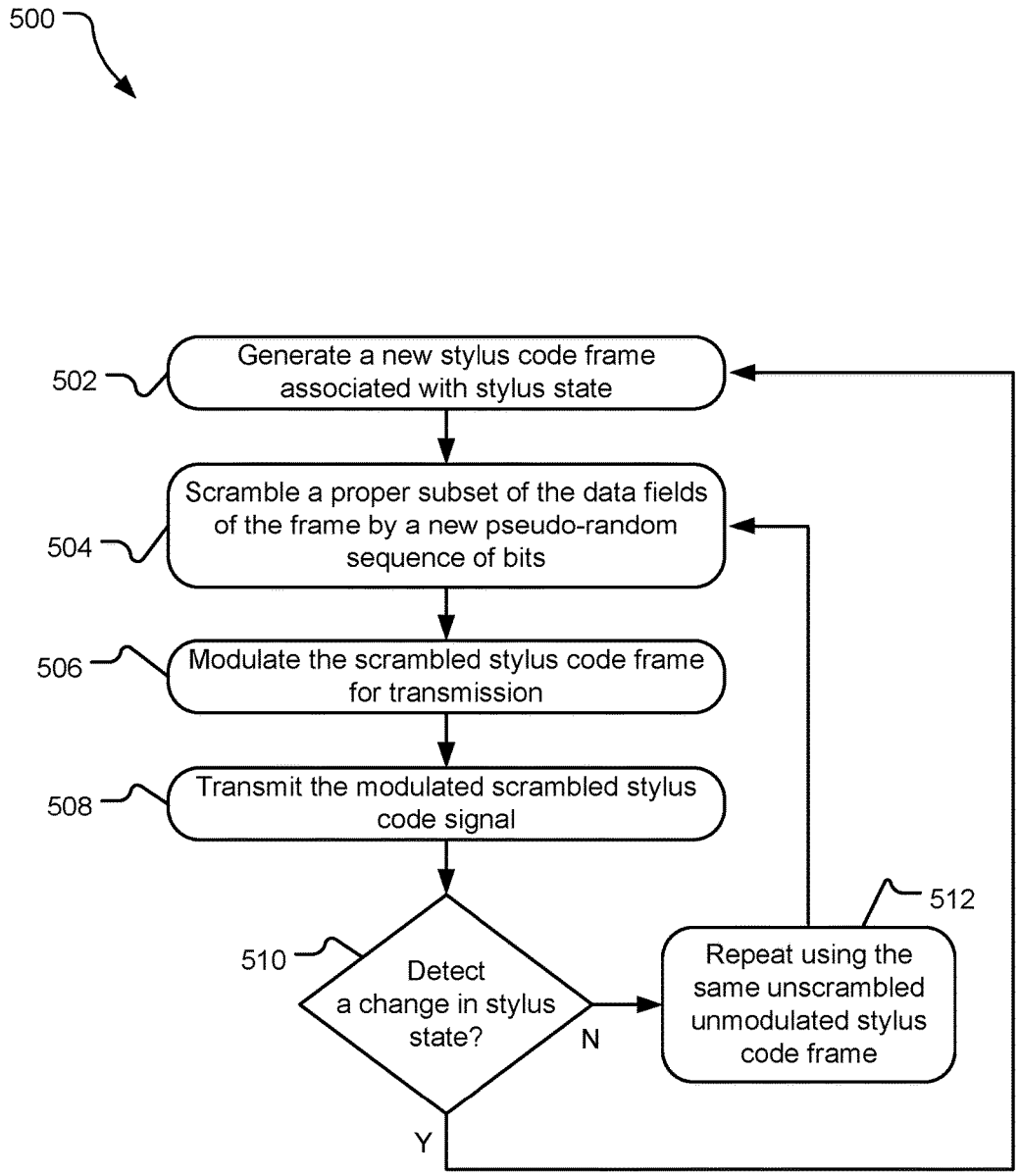
FIG. 5 illustrates example operations for generating and transmitting a scrambled stylus signal at a stylus device.

FIG. 5 illustrates example operations 500 for generating and transmitting a scrambled stylus signal at a stylus device. A generating operation 502 generates a new stylus code frame associated a stylus state (e.g., hovering, inking, button push, erase). A scrambling operation 504 scrambles a proper subset of the data fields in the stylus code frame using a new PRS of bits. It should be understood that the PRS used to scramble each proper subset of the data fields in the stylus code may be freshly generated for each stylus code frame, may be selected from a list of PRS segments, may be a segment of a PRS, such that each segment of a long PRS are applied to data fields of a successive stylus code frame, etc.

A modulation operation 506 modulates the scrambled stylus code frame for transmission as a modulated scrambled stylus code signal. A transmission operation 508 transmits the modulated scrambled stylus code signal. A decision operation 510 determines if there is a change in state of the stylus device (e.g., hovering, inking, button push, erase). If so, processing proceeds back to the generating operation 502 to generate a new stylus code frame associated with the new stylus state, which is scrambled in the scrambling operation 504 with a new PRS of bits. Otherwise, a repeating operation 512 restores the previous unscramble, unmodulated stylus code frame and processing proceeds to the scrambling operation 504, which scrambles the stylus code frame with a new PRS of bits.

Figure 6:
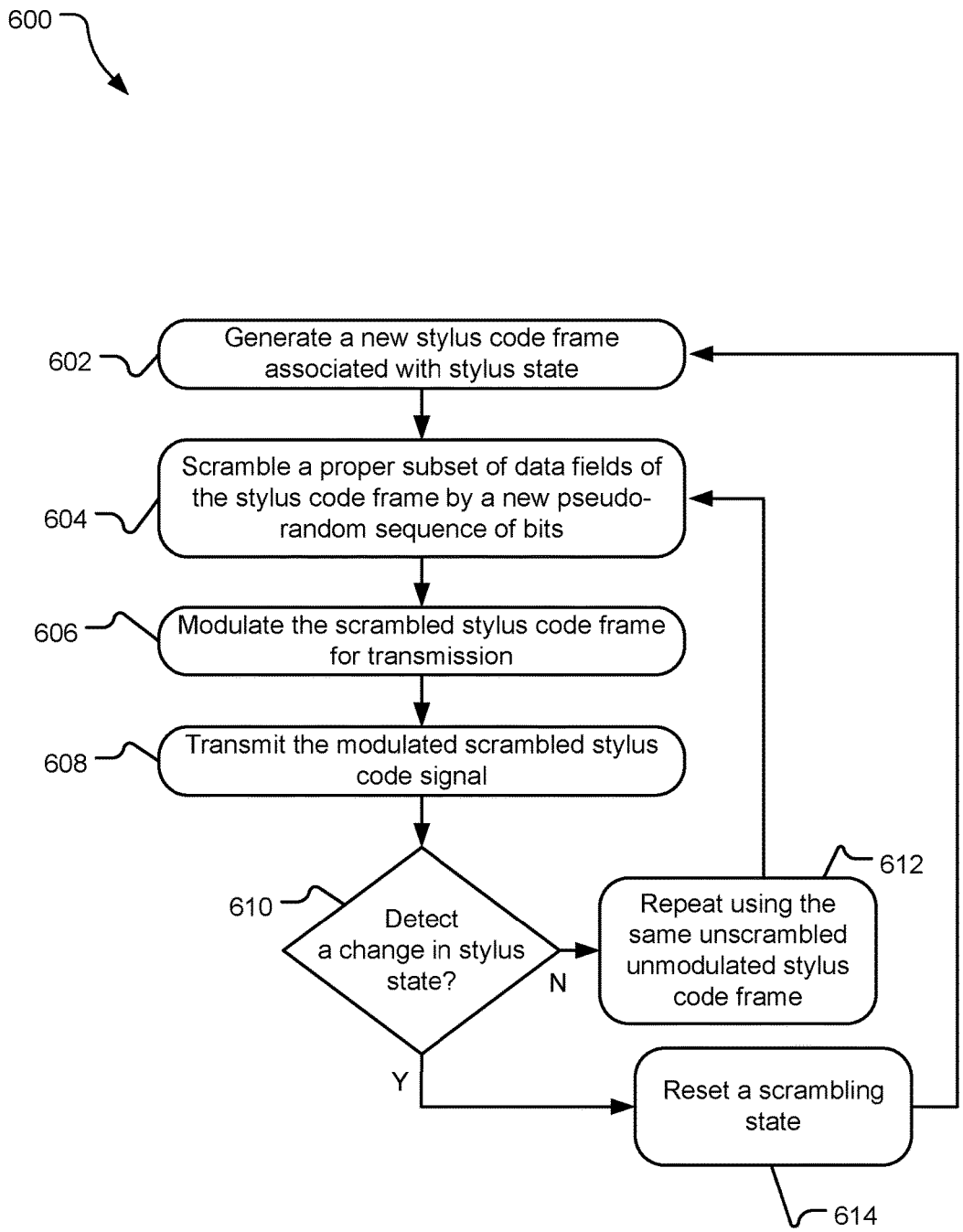
FIG. 6 illustrates example operations for generating and transmitting a scrambled stylus signal at a stylus device, wherein a change in scrambling state is triggered by a change in stylus state.

FIG. 6 illustrates example operations 600 for generating and transmitting a scrambled stylus signal at a stylus device, wherein a change in scrambling state is triggered by a change in stylus state. A generating operation 602 generates a new stylus code frame associated a stylus state (e.g., hovering, inking, button push, erase). A scrambling operation 604 scrambles a proper subset of the data fields in the stylus code frame using a new PRS of bits. It should be understood that the PRS used to scramble each proper subset of the data fields in the stylus code may be freshly generated for each stylus code frame, may be selected from a list of PRS segments, may be a segment of a PRS, such that each segment of a long PRS are applied to data fields of a successive stylus code frame, etc.

A modulation operation 606 modulates the scrambled stylus code frame for transmission as a modulated scrambled stylus code signal. A transmission operation 608 transmits the modulated scrambled stylus code signal. A decision operation 610 determines whether there is a change in state of the stylus device (e.g., hovering, inking, button push, erase). If so, a resetting operation 614 resets one or more scrambling states and processing proceeds back to the generating operation 602 to generate a new stylus code frame associated with the new stylus state, which is scrambled in the scrambling operation 604 with a new PRS of bits. Otherwise, a repeating operation 612 restores the previous unscramble, unmodulated stylus code frame and processing proceeds to the scrambling operation 604, which scrambles the stylus code frame with a new PRS of bits.

Both the host device and the stylus device can detect a change in state of the stylus. For example, a change of state from hovering to inking can be detected from a non-zero value in the pressure data field; a change to a button push state on the stylus can be detected from a data field value in a stylus code frame or a change in the stylus code frame protocol (e.g., a different stylus code format) transmitted by the stylus device. Because both devices can detect such a state change, both devices can sync their individual scrambling states in response to such detection.

Resetting of a scrambling state based upon detection of a stylus state change provides an opportunity for the host-stylus device pair to change the scrambling/descrambling operations in synchronization. A resetting of scrambling states may include without limitation:

Toggling a scrambling operation on/off

Figure 7:
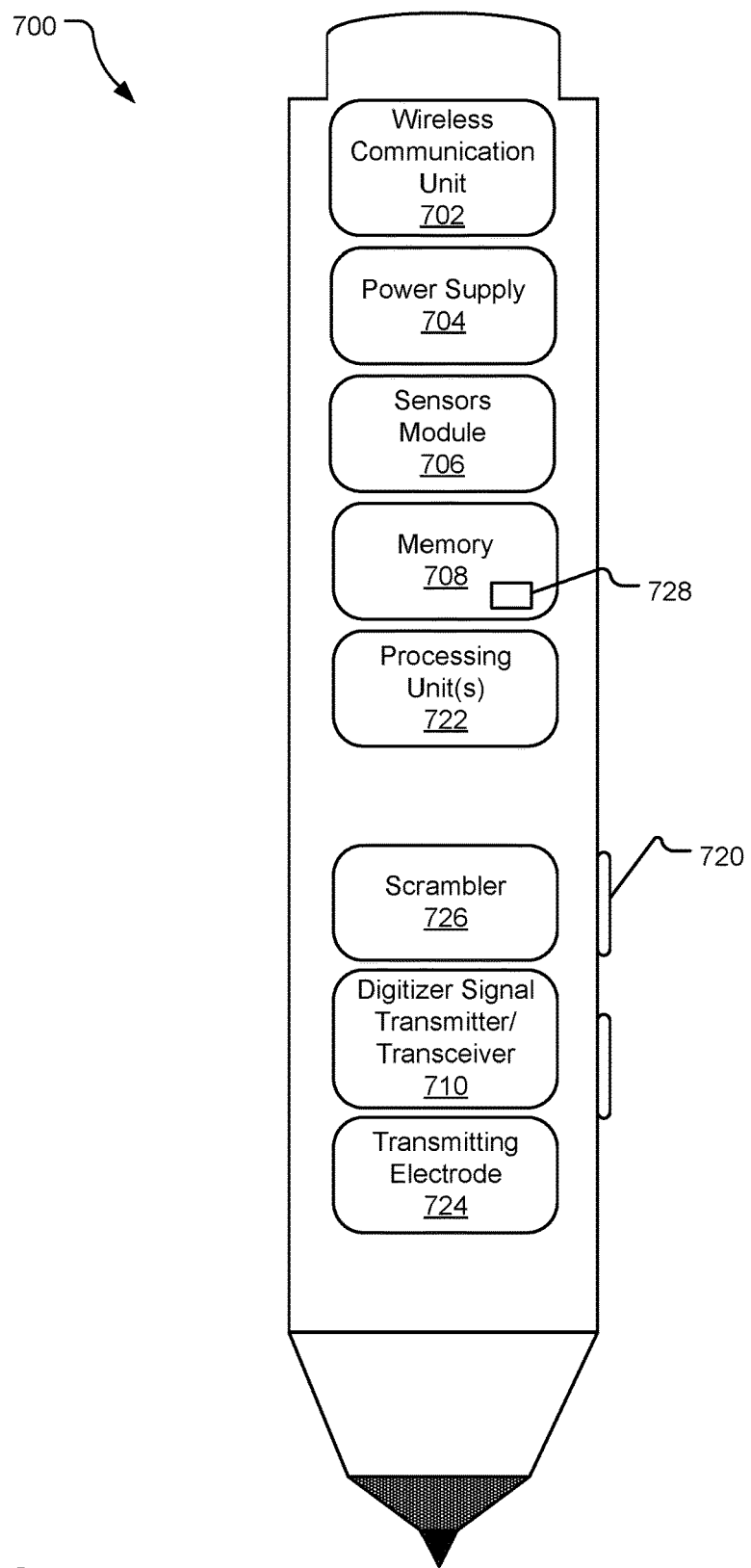
FIG. 7 illustrates components of an example stylus device.

Resetting the location in a master PRS or a list of PRS segments from which to take the next individual PRS segment Changing a phase or size of a PRS segment used in scrambling and descrambling Switching to a different list of scrambling PRS segments FIG. 7 illustrates components of an example stylus device 700. The stylus device 700 includes a wireless communication unit 702. The wireless communication unit 702 is configured to communicate with one or more host devices via various example protocols, including without limitation Bluetooth, Wi-Fi, near field communication (NFC), etc. The wireless communication unit 702 may receive protocol specification commands from a host device. The wireless communication unit 702 may include a decoder for decoding protocol specification commands. The stylus device 700 includes a power supply 704, which may comprise a battery for powering the various components of the stylus device 700.

The stylus device 700 further includes a sensors module 706. The sensors module 706 comprises one or more sensors for collecting operational information of the stylus device 700. In various implementations, the sensors module 706 includes a sensor and/or circuitry for detecting pressure, tilt, and acceleration. The sensors module 706 also monitors actuation of one or more operational mode buttons (e.g., a button 720) that trigger different operational modes (e.g., write, erase, selection).

The stylus device 700 includes a digitizer signal transmitter/transceiver 710, which includes hardware, circuitry, and/or instructions stored in a memory 708 of the stylus device 700 and executable by one or more processor units 722 for communicating with a digitizer of a host device. The memory 708 stores one or more communication protocols (including stylus code frame formats) and other information for communicating with devices. The memory 708 also stores a master pseudo-random sequence (PRS) of bits 728 (e.g., a long PRS, lists of PRS segments) from which individual PRS segments may be extracted for use by a scrambler 726 in scrambling one or more data fields of a stylus code frame (e.g., a proper subset of the data fields of the stylus code frame). A digitizer signal transmitter of the digitizer signal transmitter/transceiver 710 transmits the generated signal to the digitizer. The digitizer signal transmitter is coupled to a transmitting electrode 724 (near the tip of the stylus device or located in another part of the stylus device) for transmitting the stylus code signals to a digitizer in a host device. The various components of the stylus device 700 (e.g., the wireless communication unit 702, the memory 708 the sensors module 706, the digitizer signal transmitter/transceiver 710, the transmitting electrode 724, and the scrambler 726) are communicatively coupled to one another.

Figure 8:
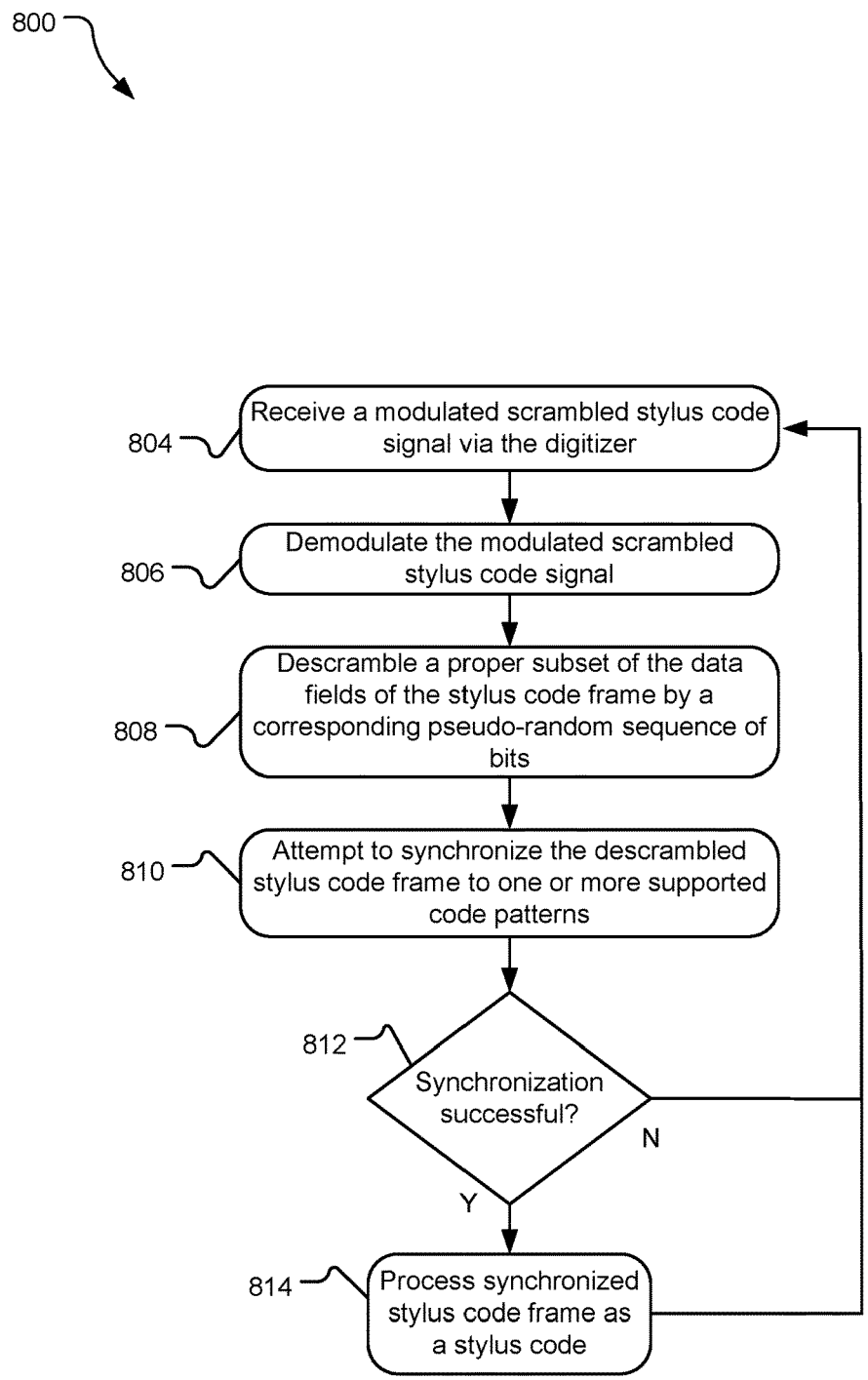
FIG. 8 illustrates example operations for receiving and synchronizing a scrambled stylus code signal at a host device.

FIG. 8 illustrates example operations 800 for receiving and synchronizing a scrambled stylus code signal at a host device. A receiving operation 804 receives a modulated scrambled stylus code signal via the digitizer of the host device. The modulated scrambled stylus code signal includes a stylus code frame, which may or not be supported by the host device.

A demodulating operation 806 demodulates the modulated scrambled frame signal to generate a scrambled code frame. A descrambling operation 808 descrambles a proper subset of the data fields in the scrambled stylus code frame using the same PRS of bits used to scramble the code frame at the transmitting stylus. A synchronization operation 810 attempts to synchronize the descrambled stylus code frame with one or more supported code patterns. Supported code patterns are not limited to prior-known patterns and can also include without limitation partially known patterns (e.g., frames with some data fields known to the host and others that are ignored by the host) and calculated patterns (e.g., a CRC pattern, an error detection code, and/or error correction code).

A decision operation 812 determines whether the synchronization attempt with a supported code pattern was successful. If not, processing proceeds to the receiving operation 804 in an attempt to acquire another stylus code. Otherwise, a processing operation 814 processes the synchronized stylus code frame as a stylus code and then processing proceeds to the receiving operation 804 in an attempt to acquire another stylus code.

Figure 9:
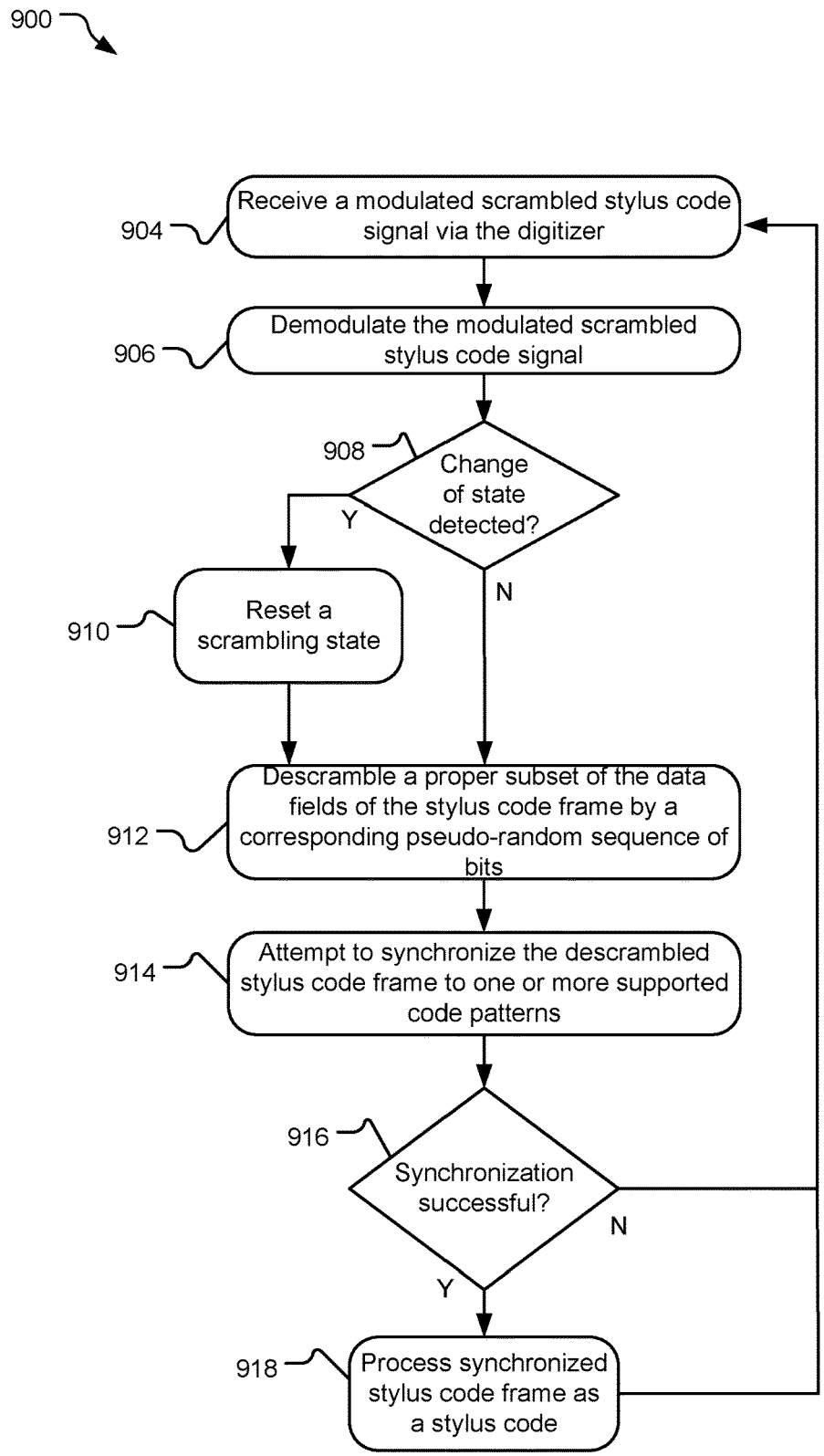
FIG. 9 illustrates example operations for communicating a stylus code signal from a stylus device to a digitizer of a host device, wherein a change in scrambling state is triggered by a change in stylus state.

FIG. 9 illustrates example operations 900 for communicating a stylus code signal from a stylus device to a digitizer of a host device, wherein a change in scrambling state is triggered by a change in stylus state. A receiving operation 904 receives a modulated scrambled stylus code signal via the digitizer of the host device. The modulated scrambled stylus code signal includes a stylus code frame, which may or not be supported by the host device.

A demodulating operation 906 demodulates the modulated scrambled stylus code signal to generate a scrambled stylus code frame. A decision operation 908 determines whether there is a change in state of the stylus device (e.g., hovering, inking, button push, erase). If not, processing proceeds to a descrambling operation 912. Otherwise, a resetting operation 910 resets one or more scrambling states and then processing proceeds to the descrambling operation 912.

The descrambling operation 912 descrambles a portion of the data fields in the scrambled stylus code frame using the same PRS of bits used to scramble the code frame at the transmitting stylus. A synchronization operation 914 attempts to synchronize the descrambled stylus code frame with one or more supported code patterns. A decision operation 916 determines whether the synchronization attempt with a supported code pattern was successful. If not, processing proceeds to the receiving operation 904 in an attempt to acquire another stylus code. Otherwise, a processing operation 918 processes the synchronized stylus code frame as a stylus code and then processing proceeds to the receiving operation 904 in an attempt to acquire another stylus code.

In at least one implementation, different PRS sets having mutually unique PRS segments may be used to provide enhanced diversity among multiple concurrently or independently transmitted signals. For example, one PRS set may be associated with a hovering state, another unique PRS set may be associated with an inking state, yet another unique PRS set may be associated with a button push state, etc. The host device then tests each successive stylus code frame with a hypothesis for a given scrambling state until synchronization is achieved. By matching the PRS set associated with a particular scrambling state, the host device can more effectively distinguish between different scrambling states (e.g., and therefore different signally protocols and operational states of the stylus). Moreover, when the stylus device and host device supported bi-directional communications, the host device may specify the PRS sets used by a particular stylus device in order to increase scrambling diversity among multiple stylus devices.

Figure 10:
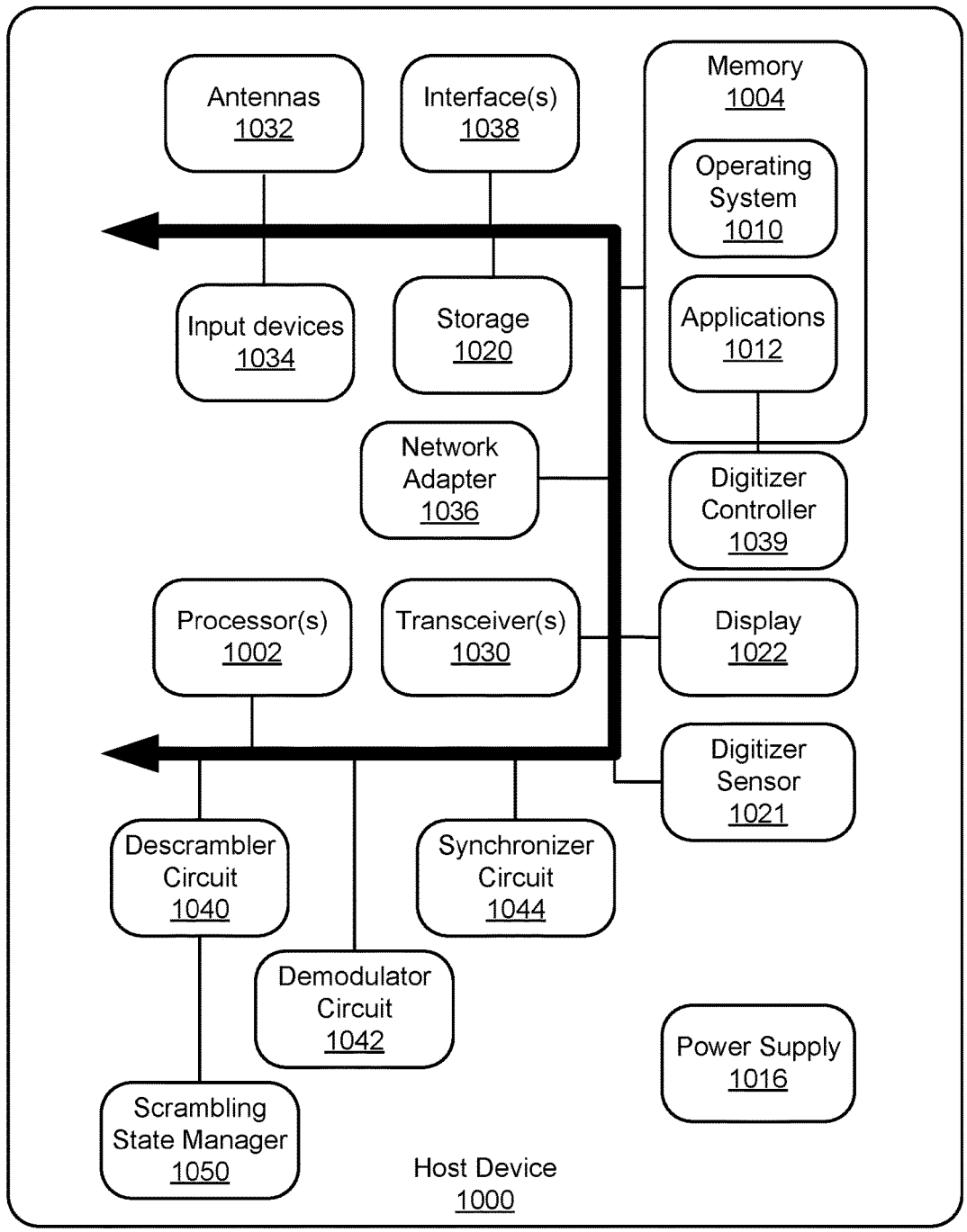
FIG. 10 illustrates an example block diagram of an example host device for communicating with an example stylus device described herein.

FIG. 10 illustrates an example block diagram of an example host device for communicating with an example stylus device described herein. The host device 1000 may be a client device such as a laptop, mobile device, desktop, tablet, or a server/cloud device. The host device 1000 includes one or more processor(s) 1002, and a memory 1004. The memory 1004 generally includes both volatile memory (e.g., RAM) and non-volatile memory (e.g., flash memory). An operating system 1010 resides in the memory 1004 and is executed by the processor(s) 1002.

One or more application programs 1012, modules, or segments, such as a drawing application, a document editing application, a digitizer controller 1039, etc. are loaded in the memory 1004 and/or storage 1020 and executed by the processor(s) 1002. Data such as communication protocol parameters, frame formats, pseudo-random sequences and PRS segments, stylus identifications, etc. may be loaded into memory 1004 or storage 1020 and may be retrievable by the processor(s) 1002 for use in the by the applications (e.g., the digitizer controller 1039), etc. The storage 1020 may be local to the host device 1000 or may be remote and communicatively connected to the host device 1000 and may include another server.

The host device 1000 includes a power supply 1016, which is powered by one or more batteries or other power sources and which provides power to other components of the host device 1000. The power supply 1016 may also be connected to an external power source that overrides or recharges the built-in batteries or other power sources.

The host device 1000 may include one or more communication transceivers 1030 to provide network connectivity (e.g., mobile phone network, Wi-Fi®, Bluetooth®) to one or more other servers and/or client devices (e.g., mobile devices, desktop computers, or laptop computers), including wireless transmissions via antennas 1032. The host device 1000 includes a digitizer sensor 1021 for communicating with one or more stylus devices and determining location and operational modes of the stylus devices. The digitizer sensor 1021 is coupled to or includes a descrambler circuit 1040, a scrambling state manager 1050, a demodulator circuit 1042, and a synchronizer circuit 1044, one or more of which may be assisted by firmware or software in the host device 1000. The descrambler circuit 1040 or descrambler is configured to descramble a proper subset of data fields in a scrambled stylus code frame, such as using a pseudo-random code fragment. The scrambling state manager 1050 is configured to detect changes in signals received from a stylus device that represent a change in stylus state, including without limitation changes between hovering and inking states, changes to and from a button press state, a change to or from an erase state, a change in pressure level on the tip of the stylus device. A demodulator circuit 1042 or demodulator is configured to demodulate a modulated stylus signal received by the host device. A synchronizer circuit 1044 or synchronizer is configured to attempt to synchronize a stylus code frame with a supported code pattern of a given communication protocol.

The host device 1000 may further include a network adapter 1036, which is a type of communication device. The host device 1000 may use the adapter and any other types of communication devices for establishing connections over a wide-area network (WAN) or local-area network (LAN). It should be appreciated that the network connections shown are exemplary and that other communications devices and means for establishing a communications link between the host device 1000 and other devices may be used.

The host device 1000 may include one or more input devices 1034 such that a user may enter commands and information (e.g., a keyboard or mouse). These and other input devices may be coupled to the server by one or more interfaces 1038 such as a serial port interface, parallel port, universal serial bus (USB), etc. The host device 1000 may further include a display 1022 such as a touch screen display.

The host device 1000 may include a variety of tangible computer-readable storage media and intangible computer-readable communication signals. Tangible computer-readable storage can be embodied by any available media that can be accessed by the host device 1000 and includes both volatile and nonvolatile storage media, removable and non-removable storage media. Tangible computer-readable storage media excludes intangible communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the host device 1000. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

In one implementation, an example host device is configured to communicate with a stylus device and includes a digitizer at the host device configured to receive a transmitted signal from the stylus device as a modulated scrambled stylus code signal including a scrambled stylus code frame. The scrambled stylus code frame has a plurality of data fields including at least one scrambled data field and at least one unscrambled data field. The at least one scrambled data field is scrambled by the stylus device using a pseudo-random sequence. A demodulator at the host device is coupled to the digitizer and configured to demodulate the modulated scrambled stylus code signal to output the scrambled stylus code frame. A descrambler at the host device is coupled to the demodulator and configured to descramble the at least one scrambled data field of the scrambled stylus code frame using the pseudo-random sequence to output at least one descrambled data field in a descrambled stylus code frame. The descrambled stylus code frame further includes the at least one unscrambled data field. A synchronizer at the host device is coupled to the descrambler and configured to synchronize the at least one descrambled data field and the at least one unscrambled data field of the descrambled stylus code frame with a supported code pattern.

Another example host device of any preceding host device is configured to process the descrambled stylus code frame as a correctly acquired stylus code received from the stylus device, responsive to successful synchronization of the descrambled stylus code frame with the supported code pattern for a given communication protocol.

Another example host device of any preceding host device is configured such that the digitizer receives one or more additional modulated signals from the stylus device concurrently with the modulated scrambled stylus code signal. Each additional modulated signal includes a stylus code frame having a plurality of data fields. At least one of the additional modulated signals does not include a scrambled data field.

Another example host device of any preceding host device is configured such that the transmitted signal includes multiple repeated scrambled stylus code frames. Each repeated scrambled stylus code frame includes a proper subset of data fields scrambled using a different pseudo-random sequence. The synchronizer fails to synchronize on multiple repeated scrambled stylus code frames of a different communication protocol.

Another example host device of any preceding host device includes a scrambling state manager configured to reset a scrambling state of the host device in synchronization with a scrambling state of the stylus device, responsive to detection of a stylus state change.

Another example host device of any preceding host device wherein a stylus state change represents a change between a hovering state and an inking state in the stylus device.

Another example host device of any preceding host device wherein a stylus state change represents a change to or from button-press state in the stylus device.

Another example host device of any preceding host device wherein a stylus state change represents a change in pressure level on a tip of the stylus device.

Another example host device of any preceding host device includes a scrambling state manager configured to reset a scrambling state of the host device in synchronization with a scrambling state of the stylus device, responsive to detection of a stylus state change, wherein the scrambling state includes a unique pseudo-random sequence set.

An example method for communicating from a first device to a second device includes receiving at the second device a transmitted signal from the first device as a modulated scrambled code signal including a scrambled code frame. The scrambled code frame has a plurality of data fields including at least one scrambled data field and at least one unscrambled data field. The at least one scrambled data field is scrambled by the first device using a pseudo-random sequence. The example method further includes demodulating the modulated scrambled code signal at the second device to output the scrambled code frame. The example method further includes descrambling the at least one scrambled data field of the scrambled code frame at the second device using the pseudo-random sequence to output at least one descrambled data field in a descrambled code frame. The descrambled code frame further includes the at least one unscrambled data field. The example method further includes synchronizing at the second device the at least one descrambled data field and the at least one unscrambled data field of the descrambled code frame with a supported code pattern.

Another example method of any preceding method includes processing the descrambled code frame as a correctly acquired code received from the first device, responsive to successful synchronization of the descrambled code frame with the supported code pattern for a given communication protocol.

Another example method of any preceding method includes receiving one or more additional modulated signals from the first device concurrently with the modulated scrambled code signal. Each additional modulated signal includes a code frame having a plurality of data fields. At least one of the additional modulated signals does not include a scrambled data field.

Another example method of any preceding method includes an operation wherein the transmitted signal includes multiple repeated scrambled code frames. Each repeated scrambled code frame includes a proper subset of data fields scrambled using a different pseudo-random sequence. The example method further includes failing to synchronize on multiple repeated scrambled code frames of a different communication protocol.

Another example method of any preceding method includes resetting a scrambling state of the second device in synchronization with a scrambling state of the first device, responsive to detection of a state change of the first device.

Another example method of any preceding method includes resetting a scrambling state of the second device in synchronization with a scrambling state of the first device, responsive to detection of a state change of the first device, wherein the scrambling state includes a unique pseudo-random sequence set.

One or more example tangible processor-readable storage media embodied with instructions for executing on one or more processors and circuits of a device a process including receiving at a digitizer of a host device a transmitted signal from a stylus device as a modulated scrambled stylus code signal including a scrambled stylus code frame. The scrambled stylus code frame has a plurality of data fields including at least one scrambled data field and at least one unscrambled data field. The at least one scrambled data field is scrambled by the stylus device using a pseudo-random sequence. The process further includes demodulating the modulated scrambled stylus code signal at the host device to output the scrambled stylus code frame, descrambling the at least one scrambled data field of the scrambled stylus code frame at the host device using the pseudo-random sequence to output at least one descrambled data field in a descrambled stylus code frame (the descrambled stylus code frame further including the at least one unscrambled data field), and synchronizing at the host device the at least one descrambled data field of the descrambled stylus code frame with a supported code pattern.

Another example media of any preceding media embodies instructions for executing a process having an operation of processing the descrambled stylus code frame as a correctly acquired stylus code received from the stylus device, responsive to successful synchronization of the descrambled stylus code frame with the supported code pattern for a given communication protocol.

Another example media of any preceding media embodies instructions for executing a process having an operation of receiving one or more additional modulated signals from the stylus device concurrently with the modulated scrambled stylus code signal, each additional modulated signal including a stylus code frame having a plurality of data fields, at least one of the additional modulated signals not including a scrambled data field.

Another example media of any preceding media embodies instructions for executing a process wherein the transmitted signal includes multiple repeated scrambled stylus code frames, each repeated scrambled stylus code frame including a proper subset of data fields scrambled using a different pseudo-random sequence, and the process further includes failing to synchronize on multiple repeated scrambled stylus code frames of a different communication protocol.

Another example media of any preceding media includes a process having an operation of resetting a scrambling state of the second device in synchronization with a scrambling state of the first device, responsive to detection of a state change of the first device.

An example host device for communicating from a stylus device to a digitizer of a host device includes means for receiving at the digitizer of the host device a transmitted signal from the stylus device as a modulated scrambled stylus code signal including a scrambled stylus code frame. The scrambled stylus code frame has a plurality of data fields including at least one scrambled data field and at least one unscrambled data field. The at least one scrambled data field is scrambled by the stylus device using a pseudo-random sequence. The example host device further includes means for demodulating the modulated scrambled stylus code signal at the host device to output the scrambled stylus code frame. The example host device further includes means for descrambling the at least one scrambled data field of the scrambled stylus code frame at the host device using the pseudo-random sequence to output at least one descrambled data field in a descrambled stylus code frame. The descrambled stylus code frame further includes the at least one unscrambled data field. The example host device further includes means for synchronizing at the host device the at least one descrambled data field and the at least one unscrambled data field of the descrambled stylus code frame with a supported code pattern.

Another example host device of any preceding host device includes means for processing the descrambled stylus code frame as a correctly acquired stylus code received from the stylus device, responsive to successful synchronization of the descrambled stylus code frame with the supported code pattern for a given communication protocol.

Another example host device of any preceding method includes means for receiving one or more additional modulated signals from the stylus device concurrently with the modulated scrambled stylus code signal. Each additional modulated signal includes a stylus code frame having a plurality of data fields. At least one of the additional modulated signals does not include a scrambled data field.

Another example host device of any preceding host device includes means for resetting a scrambling state of the host device in synchronization with a scrambling state of the stylus device, responsive to detection of a stylus state change.

Another example host device of any preceding host device includes means for resetting a scrambling state of the host device in synchronization with a scrambling state of the stylus device, responsive to detection of a stylus state change, wherein the scrambling state includes a unique pseudo-random sequence set.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A host device configured to communicate with a stylus device, the host device comprising:
   a digitizer at the host device configured to receive a transmitted signal from the stylus device as a modulated scrambled stylus code signal including a scrambled stylus code frame, the scrambled stylus code frame having a plurality of data fields including at least one scrambled data field and at least one unscrambled data field, the at least one scrambled data field being scrambled by the stylus device using a pseudo-random sequence;
   a demodulator at the host device coupled to the digitizer and configured to demodulate the modulated scrambled stylus code signal to output the scrambled stylus code frame;
   a descrambler at the host device coupled to the demodulator and configured to descramble the at least one scrambled data field of the scrambled stylus code frame using the pseudo-random sequence to output at least one descrambled data field in a descrambled stylus code frame, the descrambled stylus code frame further including the at least one unscrambled data field; and
   a synchronizer at the host device coupled to the descrambler and configured to synchronize the at least one descrambled data field and the at least one unscrambled data field of the descrambled stylus code frame with a supported code pattern.

2. The host device of claim 1 wherein the host device is configured to process the descrambled stylus code frame as a correctly acquired stylus code received from the stylus device, responsive to successful synchronization of the descrambled stylus code frame with the supported code pattern for a given communication protocol.

3. The host device of claim 1 wherein the digitizer is further configured to receive one or more additional modulated signals from the stylus device concurrently with the modulated scrambled stylus code signal, each additional modulated signal including a stylus code frame having a plurality of data fields, at least one of the additional modulated signals not including a scrambled data field.

4. The host device of claim 1 wherein the transmitted signal includes multiple repeated scrambled stylus code frames, each repeated scrambled stylus code frame including a proper subset of data fields scrambled using a different pseudo-random sequence and the synchronizer failing to synchronize on multiple repeated scrambled stylus code frames of a different communication protocol.

5. The host device of claim 1 further comprising:
a scrambling state manager configured to reset a scrambling state of the host device in synchronization with a scrambling state of the stylus device, responsive to detection of a stylus state change.

6. The host device of claim 5 wherein the stylus state change represents a change between a hovering state and an inking state in the stylus device.

7. The host device of claim 5 wherein the stylus state change represents a change to or from button-press state in the stylus device.

8. The host device of claim 5 wherein the stylus state change represents a change in pressure level on a tip of the stylus device.

9. The host device of claim 1 further comprising:
a scrambling state manager configured to reset a scrambling state of the host device in synchronization with a scrambling state of the stylus device, responsive to detection of a stylus state change, wherein the scrambling state includes a unique pseudo-random sequence set.

10. A method for communicating from a first device to a second device, the method comprising:
receiving at the second device a transmitted signal from the first device as a modulated scrambled code signal including a scrambled code frame, the scrambled code frame having a plurality of data fields including at least one scrambled data field and at least one unscrambled data field, the at least one scrambled data field being scrambled by the first device using a pseudo-random sequence;
demodulating the modulated scrambled code signal at the second device to output the scrambled code frame;
descrambling the at least one scrambled data field of the scrambled code frame at the second device using the pseudo-random sequence to output at least one descrambled data field in a descrambled code frame, the descrambled code frame further including the at least one unscrambled data field; and
synchronizing at the second device the at least one descrambled data field and the at least one unscrambled data field of the descrambled code frame with a supported code pattern.

11. The method of claim 10 further comprising:
processing the descrambled code frame as a correctly acquired code received from the first device, responsive to successful synchronization of the descrambled code frame with the supported code pattern for a given communication protocol.

12. The method of claim 10 further comprising:
receiving one or more additional modulated signals from the first device concurrently with the modulated scrambled code signal, each additional modulated signal including a code frame having a plurality of data fields, at least one of the additional modulated signals not including a scrambled data field.

13. The method of claim 10 wherein the transmitted signal includes multiple repeated scrambled code frames, each repeated scrambled code frame including a proper subset of data fields scrambled using a different pseudo-random sequence, and further comprising:
failing to synchronize on multiple repeated scrambled code frames of a different communication protocol.

14. The method of claim 10 further comprising:
resetting a scrambling state of the second device in synchronization with a scrambling state of the first device, responsive to detection of a state change of the first device.

15. The method of claim 10 further comprising:
resetting a scrambling state of the second device in synchronization with a scrambling state of the first device, responsive to detection of a state change of the first device, wherein the scrambling state includes a unique pseudo-random sequence set.

16. One or more tangible processor-readable storage media embodied with instructions for executing on one or more processors and circuits of a device a process comprising:
receiving at a digitizer of a host device a transmitted signal from a stylus device as a modulated scrambled stylus code signal including a scrambled stylus code frame, the scrambled stylus code frame having a plurality of data fields including at least one scrambled data field and at least one unscrambled data field, the at least one scrambled data field being scrambled by the stylus device using a pseudo-random sequence;
demodulating the modulated scrambled stylus code signal at the host device to output the scrambled stylus code frame;
descrambling the at least one scrambled data field of the scrambled stylus code frame at the host device using the pseudo-random sequence to output at least one descrambled data field in a descrambled stylus code frame, the descrambled stylus code frame further including the at least one unscrambled data field; and
synchronizing at the host device the at least one descrambled data field of the descrambled stylus code frame with a supported code pattern.

17. The one or more tangible processor-readable storage media of claim 16, the process further comprising:
processing the descrambled stylus code frame as a correctly acquired stylus code received from the stylus device, responsive to successful synchronization of the descrambled stylus code frame with the supported code pattern for a given communication protocol.

18. The one or more tangible processor-readable storage media of claim 16, the process further comprising:
receiving one or more additional modulated signals from the stylus device concurrently with the modulated scrambled stylus code signal, each additional modulated signal including a stylus code frame having a plurality of data fields, at least one of the additional modulated signals not including a scrambled data field.

19. The one or more tangible processor-readable storage media of claim 16 wherein the transmitted signal includes multiple repeated scrambled stylus code frames, each repeated scrambled stylus code frame including a proper subset of data fields scrambled using a different pseudo-random sequence, and the process further comprises:
  failing to synchronize on multiple repeated scrambled stylus code frames of a different communication protocol.

20. The one or more tangible processor-readable storage media of claim 16, the process further comprising:
  resetting a scrambling state of the host device in synchronization with a scrambling state of the stylus device, responsive to detection of a state change of the stylus device.

* * * * *